Dec. 1, 1925.                                              1,563,582
J. E. McDADE
SILENT READING STORY ILLUSTRATING ARRANGEMENT
Filed Feb. 9, 1924
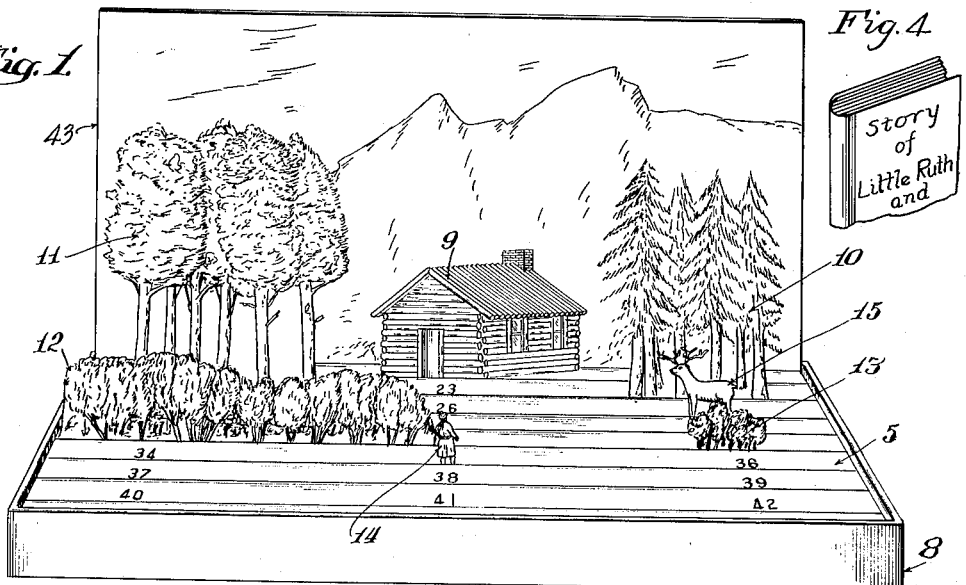
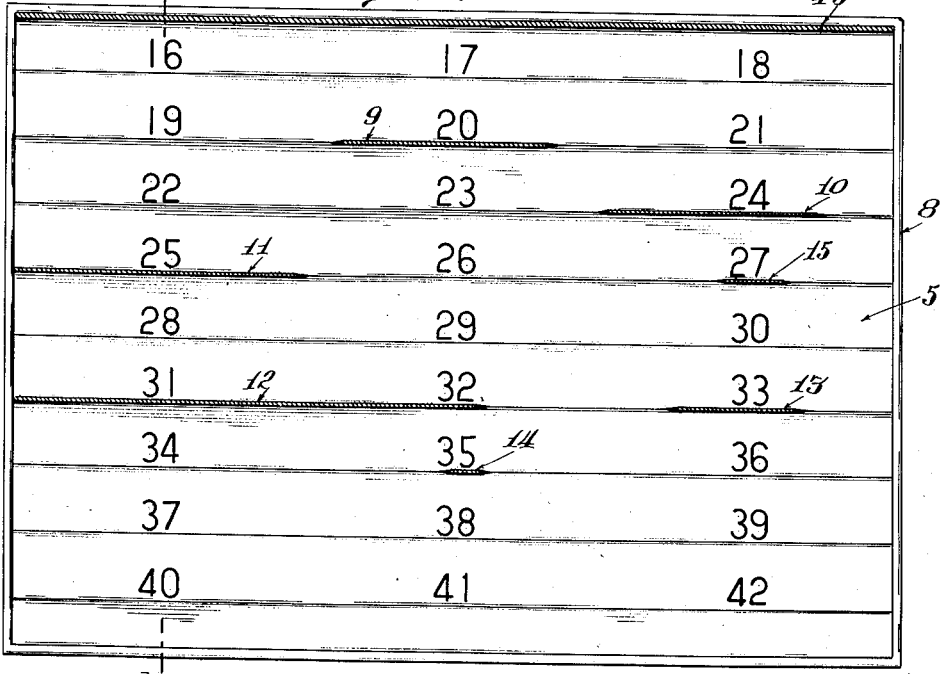
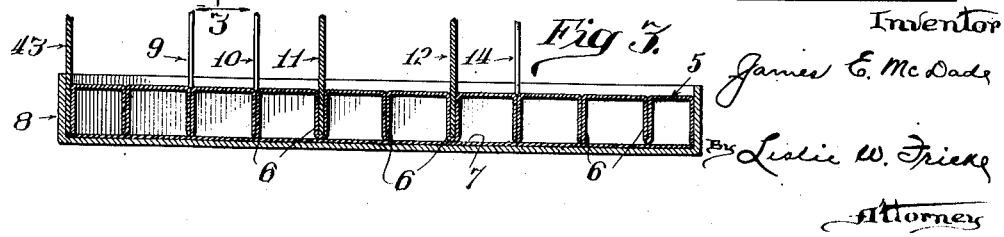
Inventor
James E. McDade
By Leslie W. Fricke
Attorney Patented Dec. 1, 1925.

1,563,582

UNITED STATES PATENT OFFICE.

JAMES E. McDADE, OF CHICAGO, ILLINOIS.

SILENT-READING STORY-ILLUSTRATING ARRANGEMENT.

Application filed February 9, 1924. Serial No. 691,678.

*To all whom it may concern:*

Be it known that I, JAMES E. MCDADE, a citizen of the United States, residing at Chicago, in the county of Cook and State of Illinois, have invented certain new and useful Improvements in Silent-Reading Story-Illustrating Arrangements, of which the following is a specification.

My invention relates to a silent reading story illustrating arrangement, and especially to an arrangement adapted for use by pupils in the lower grades particularly the kindergarten and primary grades.

One of the objects of my invention is the illustration of a story by an arrangement adapted to enable the pupil to better understand the story and to visualize, as he silently reads the story, the setting or range of activity and the various objects or persons referred to in the story by giving him something tangible and concrete to handle and work with while reading the story and thus stimulate his imagination, create and hold his interest in the subject-matter, develop his powers of perception and fix the subject-matter in his mind so that it will not be easily forgotten.

A further object is the provision of an arrangement adapted to enable the pupil to place readily various members representing the objects or persons referred to in the story on a base structure representing the range of activity referred to in the story all in the relationship stated in the story.

A further object of my invention is the provision of a base structure of simple construction, inexpensive to manufacture and well adapted for holding the members representing the various objects referred to in the story in an upright position and in the relationship stated in the story.

The invention consists in the novel arrangements and devices to be hereinafter described and claimed for carrying out the above-stated objects and such other objects as will appear from the following description of a certain preferred embodiment illustrated in the accompanying drawing, wherein—

Fig. 1 is a perspective view of an arrangement embodying the principles of my invention;

Fig. 2 is a plan view of the base structure of the arrangement shown in Fig. 1, the members representing the various objects therein being shown in section;

Fig. 3 is a sectional view taken on the line 3—3 of Fig. 2; and

Fig. 4 is a perspective view, on a reduced scale, of a fragmentary portion of a book containing the story referred to hereinafter.

Like characters of reference designate like parts in the several views.

In the arrangement shown in the drawing, the range of activity includes a base structure comprising a sheet of material 5 which is folded in a manner to provide a plurality of pockets or loops 6, see Fig. 3, the loops being held in a substantially parallel relationship and at substantially right angles to the plane of the sheet 5 by a sheet of material 7 which extends across the bottoms of said loops and is fastened to the bottoms of the respective loops by any suitable means, for example, by an adhesive material such as glue. The base structure is preferably made of cardboard and may be built into the bottom of a box-like frame 8 also made of cardboard.

The log house, pine trees, oak trees, large bushes, small bushes, little girl and deer referred to in the story hereinafter written are represented in the drawing by the respective members 9, 10, 11, 12, 13, 14 and 15, which may be made of cardboard or any other suitable material and which are preferably shaped to correspond, respectively, with the outlines of the objects or persons represented and colored to illustrate better the objects or persons. The bases of the respective cut-out members are adapted to be inserted into the several pockets or loops of the base structure.

In order to facilitate placing on the base structure the members representing the various objects or persons named in the story in the relationship stated in the story, the story may be written so that the places named therein at which the respective objects are to be located are designated by certain indicia, while the base structure bears adjacent its pockets or loops indicia corresponding to those applied to the respective places named in the story. In the present embodiment the pockets or loops provided in the base structure extend transersely across the entire structure and reference numerals have been applied to the base structure to each of the pockets or loops at three different places.

My invention will be best understood by means of the following story, it being assumed that all the members 9 to 15, inclusive, have not as yet been placed on the base structure:

Little Ruth lived in a log house in a pretty yard in the woods.

We shall put the log house (9) at number 20. There were pine and oak trees in the yard. Let us put the pine trees (10) at one side of the house at number 24, and the oak trees (11) at the other side of the house at number 25.

There were some large and small bushes in the yard along the road. Put the large bushes (12) at numbers 31 and 32, and put the small bushes (13) at number 33. The road was between the large bushes and the small bushes.

Little Ruth's mother gave her a pretty red coat. "Oh, how pretty!" said Ruth. "May I run over to grandmother's and show it to her?" "Yes, but hurry back," said her mother.

Ruth ran down the road to her grandmother's and showed her the coat. When she was coming back, she heard a noise which made her afraid. She looked up and saw a deer. Put Ruth (14) at 35, and put the deer (15) at 27. But the deer was afraid, too, and ran away.

The base structure is preferably colored to represent better the range or field of activity. In the present embodiment it would be colored green to represent grass growing in the yard. The attractiveness of the arrangement may be enhanced by placing a member 43 in the rear pocket or loop or in between the rear edge of the base structure and the adjacent side of the frame 8, the member 43 bearing a suitably colored picture to represent the background.

The arrangement is very useful in school work and home-study work for pupils of the lower grades, particularly in the kindergarten and primary grades. It enables the pupil to visualize the objects referred to in the written story. It gives the pupil something tangible and concrete to handle and work with while reading the story. It stimulates his imagination and his powers of perception. It greatly aids in creating and holding the interest of the pupil in the subject. It also develops his initiative or ingenuity. It serves to fix the subject matter of the story in the pupil's mind and it is not easily forgotten.

The construction of the base structure is very simple, inexpensive and such that the members representing the respective objects or persons are securely gripped. The base may be tilted or even turned over and the members will not fall out or become displaced.

The kind of stories which may be illustrated by means of an arrangement such as is shown in the accompanying drawings is practically unlimited. Stories relating to the happening of historical events, the carrying out of industrial processes, etc. may be vividly illustrated by the use of an appropriately designed base structure to represent the ranges or fields of activity, and appropriately cut-out and colored members to represent the objects or persons named in the stories. I do not intend to limit my invention, therefore, to any particular kind or class of stories; and it will be understood that the term "story", as used in the appended claims, is not limited to narrative matter but is used in a broad sense and as including such matter as descriptive writings, expositive treatises and the like. Neither do I intend to limit my invention to the details of construction of the base structure shown and described, except only in so far as certain of the appended claims are specifically so limited, as it will be obvious that modifications therein may be made without departing from the principles of my invention.

I claim:

1. In a silent reading story illustrating arrangement the combination with a written or printed story relating to a range of activity having certain places thereon and a plurality of objects to be located at said respective places, of a base structure representing said range and a plurality of members representing the respective objects named in the story, said base structure being so formed that said members may be arranged and supported thereon in the relationship stated in the story.

2. In a silent reading story illustrating arrangement the combination with a written or printed story relating to a range of activity having indicial places thereon and a plurality of objects to be located at said respective places, of a base structure representing said range and a plurality of members representing the respective objects named in the story, said base structure bearing indicia corresponding to those applied to the respective places named in the story, whereby said members may be readily placed on said base structure at places corresponding with those named in the story and thus brought into the relationship stated in the story.

3. In a silent reading story illustrating arrangement the combination with a written or printed story relating to a range of activity having certain places thereon and a plurality of objects to be located at said respective places, of a base structure representing said range and a plurality of members representing the respective objects named in the story, said base structure having a plurality of pockets, the bases of said members being adapted to enter said pockets whereby said members may be arranged and supported on said base structure in the relationship stated in the story.

4. In a silent reading story illustrating arrangement the combination with a written or printed story relating to a range of activity having indicial places thereon and a plurality of objects to be located at said respective places, of a base structure representing said range and a plurality of members representing the respective objects named in the story, said base structure having a plurality of pockets and bearing indicia adjacent said pockets which correspond to those applied to the respective places named in the story, the bases of said respective members being adapted to enter said pockets whereby said members may be readily placed on said base structure at places corresponding with those named in the story and thus brought into the relationship stated in the story.

5. In a silent reading story illustrating arrangement the combination with a written or printed story relating to a range of activity having certain places thereon and a plurality of objects to be located at said respective places, of a base structure representing said range and a plurality of members representing the respective objects named in the story, said base structure comprising a sheet of material folded to provide a plurality of spaced loops and bracing means for said loops, the bases of said members being adapted to enter said loops whereby said members may be arranged and supported on said base structure in the relationship stated in the story.

6. In a silent reading story illustrating arrangement the combination with a written or printed story relating to a range of activity having indicial places thereon and a plurality of objects to be located at said respective places, of a base structure representing said range and a plurality of members representing the respective objects named in the story, said base structure comprising a sheet of material folded to provide a plurality of spaced loops and bracing means for said loops, said sheet of material bearing indicia adjacent said loops which correspond to those applied to the respective places named in the story, the bases of said respective members being adapted to enter said loops whereby said members may be readily placed on said base structure at places corresponding with those named in the story and thus brought into the relationship stated in the story.

7. In a silent reading story illustrating arrangement the combination with a written or printed story relating to a range of activity having certain places thereon and a plurality of objects to be located at said respective places, of a base structure representing said range and a plurality of members representing the respective objects named in the story, said base structure comprising a sheet of material folded to provide a plurality of spaced loops, a second sheet of material, means for fastening the bottoms of said respective loops to said second-named sheet of material, the bases of said members being adapted to enter said loops whereby said members may be arranged and supported on said base structure in the relationship stated in the story.

8. In a silent reading story illustrating arrangement the combination with a written or printed story relating to a range of activity having indicial places thereon and a plurality of objects to be located at said respective places, of a base structure representing said range and a plurality of members representing the respective objects named in the story, said base structure comprising a sheet of material folded to provide a plurality of spaced loops, a second sheet of material, means for fastening the bottoms of said respective loops to said second-named sheet of material, said first-named sheet of material bearing indicia adjacent said loops which correspond to those applied to the respective places named in the story, the bases of said respective members being adapted to enter said loops whereby said members may be readily placed on said base structure at places corresponding with those named in the story and thus brought into the relationship stated in the story.

9. In an arrangement of the class described, a base structure comprising a sheet of material folded to provide a plurality of spaced loops disposed substantially at right angles to the plane of said sheet, a second sheet of material extending across the bottoms of said loops, and means for fastening the bottoms of said respective loops to said second-named sheet of material.

10. In an arrangement of the class described, the combination of a plurality of members representing objects, a base structure comprising a sheet of material folded to provide a plurality of spaced loops disposed substantially at right angles to the plane of said sheet, a second sheet of material extending across the bottoms of said loops, and means for fastening the bottoms of said respective loops to said second-named sheet of material, the bases of said respective members being adapted to enter said loops, for the purpose specified.

JAMES E. McDADE.